(12) United States Patent
Walter et al.

(10) Patent No.: US 8,442,273 B2
(45) Date of Patent: May 14, 2013

(54) METHOD AND DEVICE FOR DETECTING THE COURSE OF A TRAFFIC LANE

(75) Inventors: Michael Walter, Neuravensburg (DE); Wladimir Klein, Lindau (DE)

(73) Assignee: ADC Automotive Distance Controls Systems GmbH (DE)

( * ) Notice: Subject to any disclaimer, the term of this patent is extended or adjusted under 35 U.S.C. 154(b) by 192 days.

(21) Appl. No.: 12/740,806

(22) PCT Filed: Oct. 18, 2008

(86) PCT No.: PCT/DE2008/001706
§ 371 (c)(1),
(2), (4) Date: Aug. 5, 2010

(87) PCT Pub. No.: WO2009/056096
PCT Pub. Date: May 7, 2009

(65) Prior Publication Data
US 2010/0296700 A1    Nov. 25, 2010

(30) Foreign Application Priority Data
Oct. 31, 2007    (DE) .......................... 10 2007 051 966

(51) Int. Cl.
*G06K 9/00*    (2006.01)
*G06F 7/00*    (2006.01)

(52) U.S. Cl.
USPC ............................................ 382/104; 701/80

(58) Field of Classification Search ................... 382/100, 382/103, 104, 236; 340/901, 903, 905, 935, 340/937, 938, 988; 701/80, 65
See application file for complete search history.

(56) References Cited

U.S. PATENT DOCUMENTS 6,819,779 B1 * 11/2004 Nichani ........................ 382/104
7,242,817 B2 * 7/2007 Takeda et al. .................. 382/278

FOREIGN PATENT DOCUMENTS

| EP | 1 227 438 A2 | 7/2002 |
| EP | 1 304 607 A1 | 4/2003 |
| EP | 1 600 909 A2 | 11/2005 |
| JP | 2003 346 286 | 12/2003 |
| JP | 2005 267 384 | 9/2005 |

OTHER PUBLICATIONS

Kaske, A. et al. "Lane Boundary Detecting Using Statistical Criteria", International Conference on Quality Control by Artifical Vision, 1997.

Vlacid LJubo ED, "Intelligent Vehicle Technologies: Theory and Applications, Chapter 6: From door to door—principles and applications of computer vision for driver assistant systems", Intelligent Vehicle Techonologies: Theory and Applications, Butterworth-Heinemann, Oxford; pp. 135-138, Jan. 1, 2001.

Translation of the Official Letter of Provisional Rejection of Japanese Patent Application No. 2010 534 356 dated Nov. 13, 2012.

* cited by examiner

*Primary Examiner* — Abolfazl Tabatabai
(74) *Attorney, Agent, or Firm* — RatnerPrestia

(57) ABSTRACT

A method for detecting the course of a traffic lane, including the following steps:

measuring structures of the traffic lane; evaluating the homogeneity of the measurements; and determining the course of the traffic lane on the basis of the evaluated homogeneity.

13 Claims, 4 Drawing Sheets

METHOD AND DEVICE FOR DETECTING THE COURSE OF A TRAFFIC LANE

CROSS REFERENCE TO RELATED APPLICATIONS

This application is the U.S. national phase of PCT International Application No. PCT/DE2008/001706, filed Oct. 18, 2008, which claims priority to German Patent Application No. 10 2007 051 966.6, filed Oct. 31, 2007, the contents of such applications being incorporated by reference herein.

FIELD OF THE INVENTION

In automobiles, advanced driver assistance systems are increasingly being used that assist the driver in maintaining the tracking stability of the vehicle (so-called Lane Keeping Support). Realizations of such systems are called Lane Departure Warning Systems (LDWS) when they warn the driver if he or she deviates from the traffic lane unintentionally. Some systems can even intervene in the steering directly and are called Lane Keeping Systems (LKS). Both the LDWS and the LKS systems measure the vehicle position relative to the traffic lane.

BACKGROUND OF THE INVENTION

These systems are based on the evaluation of images that were acquired by means of a camera, e.g. a CMOS camera. For evaluation, a special image processing algorithm is used that evaluates structures in the acquired images that are characteristic of a traffic lane and the course thereof, e.g. road markings or verges of a traffic lane, such as crash barriers and the like. This evaluation is also called "tracking" since it tracks the characteristic structures in continuous images by means of image analysis.

For ensuring the operatability of such systems it is essential to evaluate the characteristic structures reliably. It is particularly important to distinguish between structures that are important for correct tracking and structures that are unimportant. Unimportant structures are, for example, turfs or snow-covered verges that may have structures that look like those of a road marking. The wrong classification of such unimportant structures as important structures may result in false tracking and thus in false warnings by an LDWS or even in a wrong LKS intervention in the steering.

It is therefore an object of the present invention to propose an improved method and an improved device for detecting the course of a traffic lane.

SUMMARY OF THE INVENTION

This object is achieved by a method for detecting the course of a traffic lane.

One basic idea of the invention consists in distinguishing between structures that are important for correct tracking and structures that are unimportant by evaluating the homogeneity of structures. This idea is based on the knowledge of the fact that the homogeneity of edge pairs within turfs or within snow-covered verges mostly differs from that of road markings. Structures on turfs or on snow-covered verges quite often have irregular structures that are distributed at random, whereas road markings, by contrast, have a defined geometrical shape. According to aspects of the invention, the homogeneity of a structure is therefore suitable for evaluating and distinguishing between structures that are important for correct tracking and structures that are unimportant, whereby false tracking on account of unimportant structures can be avoided and the detection of the course of the traffic lane can thus be improved.

According to one embodiment, the invention relates to a method for detecting the course of a traffic lane, comprising the following steps:
measuring structures of the traffic lane;
evaluating the homogeneity of the measurements; and
determining the course of the traffic lane on the basis of the evaluated homogeneity.

Typically, the method can be implemented in the form of an algorithm that is executed by a lane detection system. The algorithm can also be implemented in a driver assistance system or generally in a safety system for a vehicle. The measurements can be taken by a camera or by another imaging sensor. Thus, the measurements represent those structures detected in continuous images of a course of a road in front of a vehicle which are important for the automatic determination of the course of the traffic lane, e.g. the road markings, crash barriers or road demarcations.

According to one embodiment of the invention, the homogeneity of the determined structures can be evaluated by determining the density of the area enclosed by the measurements and of the number of measurements. It has turned out that the parameters used for evaluating the homogeneity can be determined relatively well on the basis of the data that are provided by the measurements or can be derived therefrom.

According to one embodiment of the invention, the density can be determined as the quotient of the area of a bounding box enclosing the measurements and of the number of measurements. One advantage of this embodiment consists in the fact that the quotient can be determined with relatively little computational effort. In general, a bounding box is a box-shaped formation, in particular a rectangle, that circumscribes corresponding objects. In the present context, the bounding box is particularly a rectangle that encloses the measurements, in particular a certain accumulation of measurements, e.g. several measurements that follow each other almost on one line, which type of measurements can typically occur with a traffic line. The bounding box can be automatically formed by an image processing algorithm for evaluating the acquired images of the course of the road.

Furthermore, according to one embodiment of the invention, the coordinate system used for the measurements can be rotated provided that the measured structures are arranged diagonally, whereby considerably smaller bounding boxes can be determined for diagonal structures, which makes a higher degree of accuracy of evaluation possible. Particularly with a winding course of the traffic lane, rotating the coordinate system of image processing can have an advantageous effect on the detection of false tracking since the accuracy of detection can be improved.

According to embodiments of the invention, the coordinate system can be rotated by an iterative method or by principal component analysis (PCA).

A measure for the area of the bounding box enclosing the measurements can be formed from the eigenvalues determined by principal component analysis, and the area measure formed in this way can be divided by the number of measurements in order to obtain the density. As a result of the principal component analysis, eigenvectors and eigenvalues of the distribution of the measured values are obtained. The eigenvectors describe the direction of the principal components, and the eigenvalues describe the variances in the direction of the principal components. The roots of the variances correspond to the standard deviations, and the product can then be used as the measure for the calculation of area, for example. By the division by the number of measurements, a density measure can be obtained that is suitable for the detection of false tracking.

According to an alternative embodiment of the invention, the bounding box can also be determined from the differences between the measurements and a prediction of the measurements. This method is particularly suitable for a steady-state system. The advantage of this embodiment consists in the fact that its implementation requires relatively little computational effort.

According to one embodiment of the invention, the bounding box can also be determined only from the differences between the measurements and a prediction of the measurements, which makes it possible to avoid false tracking only on straight traffic lanes and the possibly problematic tracking in bends.

Moreover, according to one embodiment of the invention, the beginning and the end of a marking of a dashed traffic lane can be determined by the detection of transitions on the basis of the measurements, whereby false tracking can also be avoided when the road marking is discontinuous. It is also possible to avoid the area enclosed by a bounding box becoming very large when the road markings are discontinuous, although the measurements can be distributed compactly.

As mentioned above, structures of the traffic lane can be measured by means of an image analysis of camera images according to one embodiment of the invention.

According to a further embodiment, the invention relates to a device for detecting the course of a traffic lane, comprising:
 a measuring device for measuring structures of the traffic lane; and
 an evaluating device for evaluating the homogeneity of the measurements and determining the course of the traffic lane on the basis of the evaluated homogeneity.

Moreover, according to one embodiment of the invention, the device can be designed to execute a method according to aspects of the invention and as explained above.

Furthermore, according to one embodiment, the invention relates to an automatic lane departure warning system or lane keeping system that has a device according to aspects of the invention and as described above.

Eventually, according to one embodiment, the invention relates to a vehicle with an automatic lane departure warning system or lane keeping system according to aspects of the invention and as described above.

Further advantages and possible applications of the present invention can be inferred from the following description in conjunction with the exemplary embodiment/s illustrated in the drawing/s.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
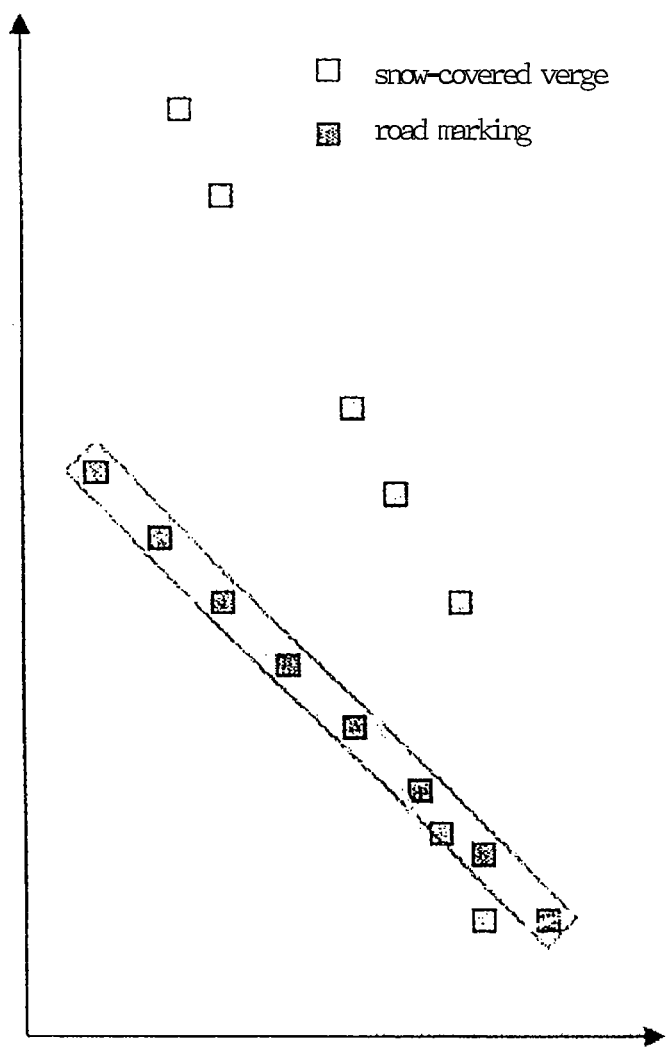
FIG. 1 depicts a diagram with regular and irregular structures of varying homogeneity, which type of diagram can be extracted from one or several camera images.

In the following, identical reference numerals may be assigned to similar and/or functionally similar elements. The absolute values and dimensions indicated in the following are exemplary values only and do not restrict the invention to such dimensions.

FIG. 1 shows a diagram with regular and irregular structures of varying homogeneity. The structures were determined by measurements, in particular by camera images acquired by means of a CMOS camera, which CMOS camera is mounted in a motor vehicle, in particular on the windscreen in the region of the rear view mirror, and continuously detects the course of the roadway/traffic lane in front of the vehicle.

The acquired camera images are evaluated by an image processing algorithm in such a manner that the structures can be extracted and shown in a coordinate system like that of the diagram shown in FIG. 1. The dark structures are regular structures and represent a road marking, whereas the bright structures are caused by a snow-covered verge and are irregular structures.

A rectangular bounding box is arranged around the accumulation of dark structures, which rectangle in principle represents the course of the road marking. According to aspects of the invention it can now be determined on the basis of the density measure which of the structures are important structures, i.e. structures that are characteristic of the course of the traffic lane, and which structures are unimportant structures, i.e. structures that are unimportant for the correct detection of the course of the traffic lane.

According to aspects of the invention, the density measure is determined from the quotient of the area of the bounding box enclosing the measurements/dark structures (e.g. the absolute minima and maxima of all measurements) and of the number of measurements. The smaller the density measure, the more likely it is that an important structure was detected by the corresponding bounding box. A corresponding classification can then take place in the algorithm for detecting the course of the traffic lane.

Figure 2:
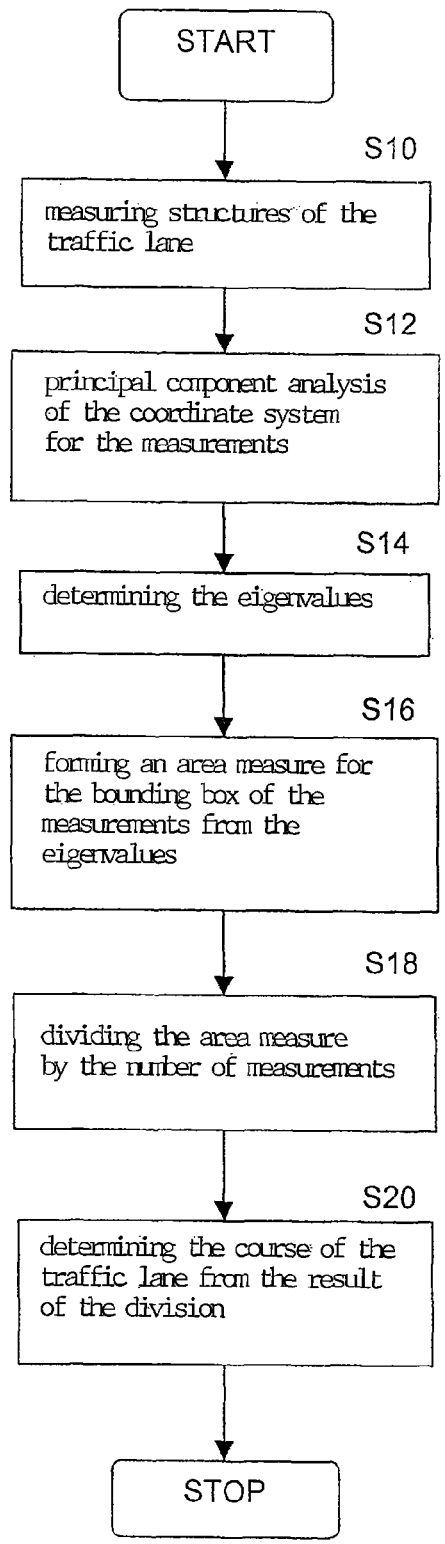
FIG. 2 depicts a flow chart of an exemplary embodiment of the inventive method for detecting the course of a traffic lane.

FIG. 2 shows a flow chart with the basic steps of an algorithm for detecting the course of a traffic lane:

First, in step S10, structures of the traffic lane are measured, which can be done by continuously acquiring images by means of an electronic camera and extracting important structures from the acquired images, as described above.

The next step, step S12, is a principal component analysis of the coordinate system for the measured structures.

In the next step, in step S14, the eigenvalues are determined as described above.

As described above as well, an area measure for each bounding box of the measured structures is formed on the basis of the eigenvalues (step S16), wherein a bounding box is usefully arranged around each accumulation of measured structures, i.e. several bounding boxes can be formed. The area measure of each bounding box is then formed.

In the next step, in step S18, the area measure is divided by the number of measured structures in a bounding box in order to obtain the density. The density serves as a criterion for classifying an overall structure formed by several measured structures as being important or unimportant for tracking the course of the traffic lane.

In the last step, in step S20, the density determined in this way is evaluated in order to determine the course of the traffic lane. For this purpose, an accumulation of measured structures can be characterized as being important for the course of the traffic lane when a certain minimum density is reached, for example.

Figure 3:
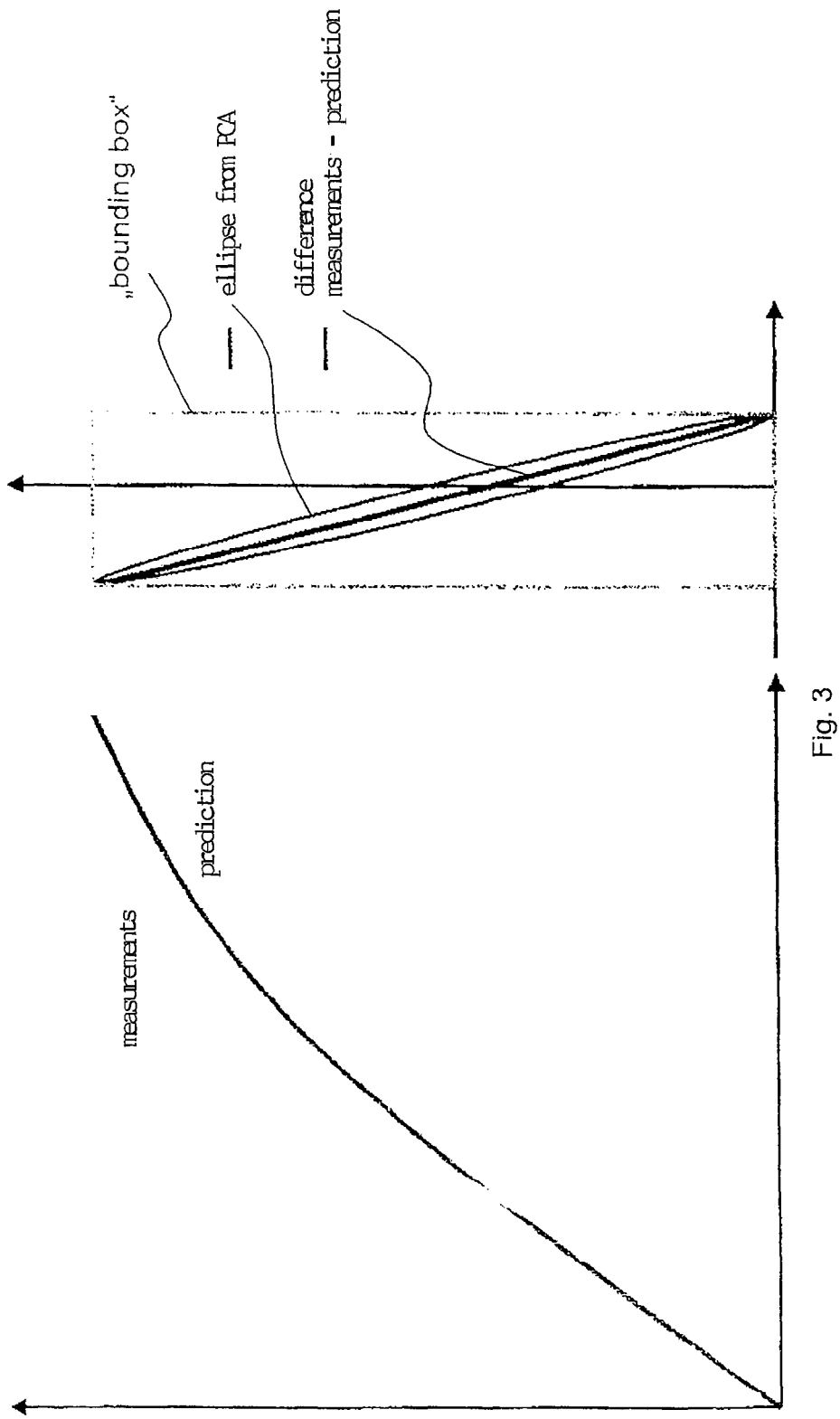
FIG. 3 depicts a comparison of the enclosed areas between a simple bounding box, the PCA-transformed distribution and the bounding box from the difference between the measurement and a prediction.

As explained above, the use of a simple bounding box might not be absolutely suitable, in particular if markings in the camera coordinate system are mostly arranged diagonally. By rotating the coordinate system, considerably smaller rectangles can be determined for diagonal structures, as explained in greater detail in the following in connection with FIG. 3. The coordinate system can be rotated by an iterative process or e.g. by principal component analysis (PCA) (see step S12 in FIG. 1). FIG. 3 shows the comparison of enclosed areas between a simple bounding box in the non-rotated coordinate system, the PCA-transformed distribution of measurements and the bounding box formed from the difference between measurements and a prediction of the course of the traffic lane in order to illustrate how the enclosed area can be reduced.

Figure 4:
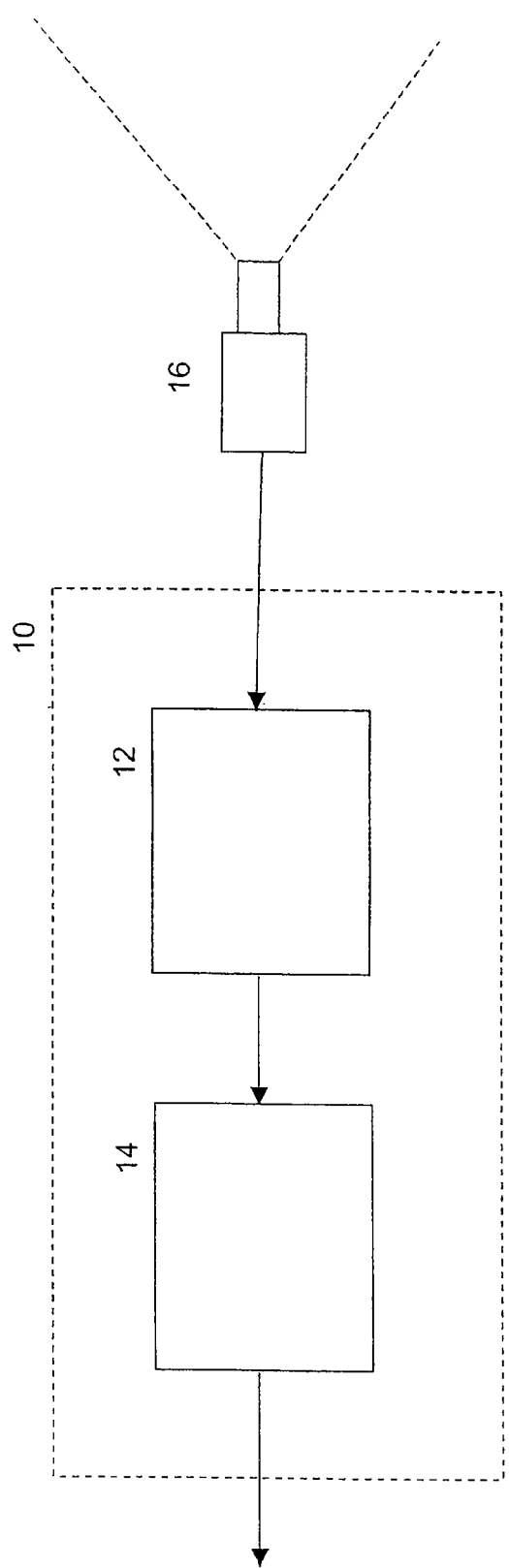
FIG. 4 depicts a block diagram of an exemplary embodiment of a device for detecting the course of a traffic lane according to aspects of the invention.

Finally, FIG. 4 shows a block diagram of a device 10 for detecting the course of a traffic lane. The device 10 is connected to a camera 16 that acquires images of a region in front of a vehicle in which the device 10 and the camera 16 are installed.

The images acquired by the camera 16 are evaluated in the device 10 in order to detect the course of the traffic lane and particularly in order to avoid false tracking on the basis of the images. For this purpose, the device has a measuring device 12 for measuring structures of the traffic lane.

For this purpose, the measuring device 12 may particularly comprise an image evaluating algorithm that extracts, from the images acquired by the camera, structures that may be important for the course of the traffic lane. FIG. 1 shows an example for structures that are extracted (i.e. measured) in this way.

The structures determined by the measuring device 12 are supplied to an evaluating device 14 that is particularly designed to evaluate the homogeneity of the measurements and to determine the course of the traffic lane therefrom. For this purpose, an algorithm is implemented in the evaluating device 14, said algorithm implementing in particular the steps S12 to S20 of the method shown in FIG. 2.

Both the device 10 and the devices 12 and 14 may be implemented in the form of a computer program that is stored in a memory and that is executed by an appropriately powerful processor.

In summary, according to aspects of the invention, the tracking of traffic lanes can be improved by being able to reliably separate structures that are important for the course of the traffic lane from unimportant structures. For this purpose, according to aspects of the invention, a measure for assessing whether a structure is important or unimportant for the detection of the course of the traffic lane is introduced.

The invention claimed is:

1. Method for detecting a course of a traffic lane, comprising the following steps:
   using a processor to perform the steps of:
   measuring structures of the traffic lane;
   evaluating a homogeneity of the measurements; and
   determining the course of the traffic lane on a basis of the evaluated homogeneity,
   wherein the homogeneity of the structures is evaluated by determining a density of an area enclosed by the measurements and of a number of measurements.

2. Method according to claim 1, wherein the density is determined as a quotient of the area of a bounding box enclosing the measurements and of the number of measurements.

3. Method according to claim 2, wherein, provided that the measured structures are arranged diagonally, a coordinate system used for the measurements is rotated.

4. Method according to claim 3, wherein the coordinate system is rotated by an iterative method or by principal component analysis.

5. Method according to claim 4, wherein a measure for the area of the bounding box enclosing the measurements is formed from eigenvalues determined by principal component analysis and the area measure formed in this way is divided by the number of measurements in order to obtain the density.

6. Method according to claim 2, wherein the bounding box is determined from differences between the measurements and a prediction of the measurements.

7. Method according to claim 2, wherein the bounding box is determined only from the differences between the measurements and a prediction of the measurements.

8. Method according to claim 1, wherein a beginning and an end of a marking of a dashed traffic lane are determined by detecting transitions on a basis of the measurements.

9. Method according to claim 1, wherein structures of the traffic lane are measured by an image analysis of camera images.

10. Device for detecting a course of a traffic lane, comprising:
    a measuring device for measuring structures of the traffic lane; and
    an evaluating device for evaluating a homogeneity of the measurements and determining the course of the traffic lane on a basis of the evaluated homogeneity,
    wherein the homogeneity of the structures is evaluated by determining a density of an area enclosed by the measurements and of a number of measurements.

11. Device according to claim 10, wherein the device is configured to execute a method.

12. Automatic lane departure warning system or lane keeping system that has a device according to claim 10.

13. Vehicle with an automatic lane departure warning system or lane keeping system according to claim 12.

* * * * *

UNITED STATES PATENT AND TRADEMARK OFFICE
CERTIFICATE OF CORRECTION

PATENT NO.       : 8,442,273 B2  
APPLICATION NO.  : 12/740806  
DATED            : May 14, 2013  
INVENTOR(S)      : Walter et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 378 days.

Signed and Sealed this
Eighth Day of September, 2015

Michelle K. Lee
*Director of the United States Patent and Trademark Office*